No. 846,733. PATENTED MAR. 12, 1907.
J. & F. DOEPKER.
CLUTCH MECHANISM.
APPLICATION FILED OCT. 29, 1906.
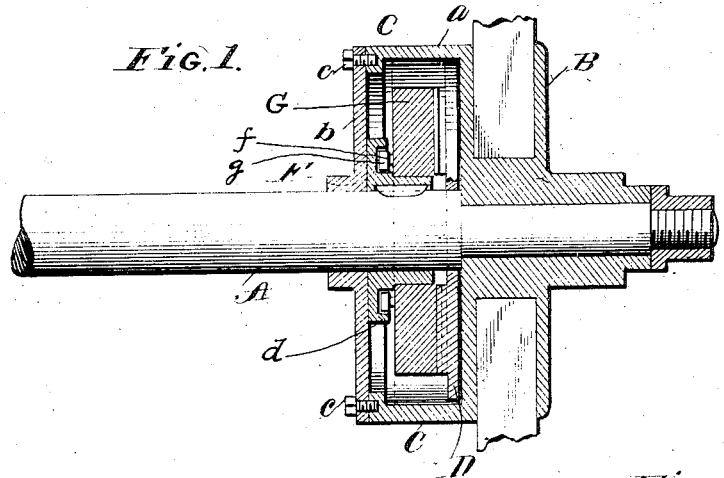
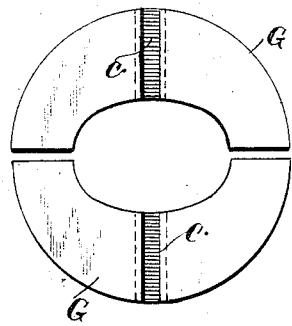
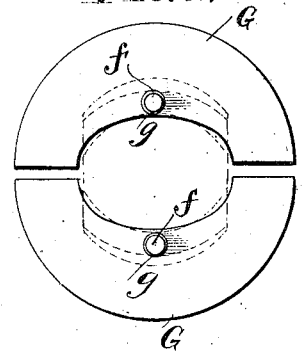
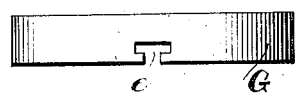
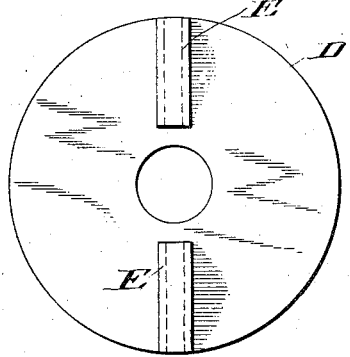
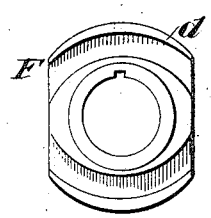
Witnesses
Inventors
Joseph Doepker &
Frank Doepker.
By James J. Shuhy
Attorney

UNITED STATES PATENT OFFICE.

JOSEPH DOEPKER AND FRANK DOEPKER, OF OTTAWA, OHIO.

CLUTCH MECHANISM.

No. 846,733.   Specification of Letters Patent.   Patented March 12, 1907.

Application filed October 29, 1906. Serial No. 341,040.

*To all whom it may concern:*

Be it known that we, JOSEPH DOEPKER and FRANK DOEPKER, citizens of the United States, residing at Ottawa, in the county of Putnam and State of Ohio, have invented new and useful Improvements in Clutch Mechanism, of which the following is a specification.

Our invention relates to the drive shafts or axles and wheels of motor-vehicles, and more particularly to clutch mechanisms for transmitting motion from a shaft or axle to a wheel and for permitting the wheel to turn freely on the shaft or axle when it "overruns" the same, this to enable a vehicle to readily turn a corner without skidding; and it consists in a clutch mechanism embodying the compact, efficient, and durable construction hereinafter described and particularly defined in the claims appended.

In the accompanying drawings, forming part of this specification, Figure 1 is a view, partly in section and partly in elevation, of a shaft or axle and a wheel provided with our improvements. Fig. 2 is a view illustrating by full lines the sides of the radially-movable shoes remote from the wheel and by dotted lines the cam for moving said shoes. Fig. 3 shows the sides of the shoes that are presented to one side of the disk comprised in the clutch. Fig. 4 is an elevation of the said side of the disk. Fig. 5 is an edge view of one of the shoes, showing the T-form groove therein. Fig. 6 is a cross-section of the cam, and Fig. 7 is an elevation of the side of the cam that is presented to the shoes.

Similar letters designate corresponding parts in all of the views of the drawings, referring to which—

A is a drive shaft or axle.

B is a wheel which is suitably retained on the outer portion of the shaft or axle, and C is the clutch-casing which comprises a rim *a*, fixed to and extending inward from the wheel B, and a closure-plate *b*, loosely surrounding the shaft or axle and detachably connected to the rim through screws *c* or other suitable means.

On the shaft or axle A within the casing C is loosely mounted a disk D, having on its side remote from the wheel B radial ribs E of T form in cross-section, while keyed or otherwise fixed on the shaft or axle at the opposite side of disk D with reference to the wheel B is a cam F, preferably of the shape shown, equipped with curvilinear flanges *d* of right-angle form in cross-section.

In additon to the parts mentioned our improved clutch comprises radially-movable shoes G, which are arranged between the disk D and the cam F, as best shown in Fig. 1. These shoes G are provided in one side with grooves *e*, corresponding in shape to and receiving the ribs E on disk D, and at their opposite side they have lateral pins *f*, on which are antifriction-rollers *g*, disposed in the curvilinear camways formed by the right-angle flanges *d* of the cam F. By virtue of the T-shaped grooves in the shoes G, receiving the T-shaped ribs on the disk D, it will be apparent that the shoes are at once held to the side of the disk and are guided in their radial movements toward and from the rim of the casing C, and it will also be apparent that the provision of the flanges *d* on the cam F to receive the pins on the shoes G is advantageous, since the cam is thereby enabled while moving toward the position shown in Fig. 2 to draw the shoes inward or toward the center of the shaft or axle A.

The operation of our improved construction of clutch is as follows: When the shaft or axle A is rotated, the cam F, engaging the antifriction-rollers *g* on pins *f*, will force the shoes G outward against the casing-rim *a*, and thereby fix the wheel B on the shaft or axle A, so as to cause the two to turn together—*i. e.*, assure the wheel being turned by the shaft or axle. When, however, the wheel overruns the shaft or axle, as is the case when the wheel is the outer wheel incident to the turning of a corner, it will be observed that the wheel in tending to turn freely on the axle will carry the disk D around with it when the flanges *d* on the cam coöperating with the antifriction-rollers *g* and pins *f* of the shoes will move the shoes inward or toward the center of the shaft or axle A, and thereby render the wheel entirely free of the axle. It will further be observed that on the shaft or axle overtaking the wheel, which takes place when vehicle resumes its straight course, the cam F, acting against the shoes G, will fix the wheel to the shaft or axle and assure the former being turned by the latter.

From the foregoing it will be gathered that in addition to being simple, compact, and not likely to get out of order after a short period of use our improved construction of clutch is quick and easy in operation and may therefore be depended on to release the wheel from the axle and fix the wheel to the axle at the proper times.

The construction herein shown and described constitutes the preferred embodiment of our invention; but we desire it understood that in practice such changes in the form, construction, and relative arrangement of parts may be made as fall within the scope of the appended claims without departure from our invention.

Having described our invention, what we claim, and desire to secure by Letters Patent, is—

1. In a clutch mechanism, the combination of a shaft or axle, a wheel loosely mounted on the shaft or axle and equipped with a rim, a disk loosely mounted on the axle and having a rib of T form in cross-section on one side, a shoe movable toward and from the rim and having a groove of T form in cross-section receiving the rib of the disk, and a cam fixed on the axle and arranged to move the shoe with respect to the rim.

2. In a clutch mechanism the combination of a shaft or axle, a wheel loosely mounted thereon and equipped with a rim, a cam fixed on the shaft or axle and having a curvilinear flange, of angular form in cross-section, and a shoe arranged between the cam and the rim so as to be moved by the former against the latter, and having a lateral pin engaged by the curvilinear flange of the cam, for the purpose set forth.

3. In a clutch mechanism, the combination of a shaft or axle, a wheel loosely mounted on the shaft or axle and equipped with a rim, a disk loosely mounted on the axle and having ribs of T form in cross-section on one side, shoes movable toward and from the rim and having grooves of T form in cross-section receiving the ribs of the disk and also having lateral pins on which are antifriction-rollers, and a cam fixed on the shaft or axle in position to force the shoes outward and having curvilinear flanges, of angular form in cross-section, receiving the antifriction-rollers on the lateral pins of the shoes.

In testimony whereof we have hereunto set our hands in presence of two subscribing witnesses.

JOSEPH DOEPKER.
FRANK DOEPKER.

Witnesses:
J. W. SMITH,
G. F. ZELLER.